(12) United States Patent
Yang et al.

(10) Patent No.: US 11,575,879 B2
(45) Date of Patent: Feb. 7, 2023

(54) STEREOSCOPIC IMAGE DISPLAY DEVICE

(71) Applicant: Lixel Inc., Taipei (TW)

(72) Inventors: Chun-Hsiang Yang, Hsinchu (TW); Chih-Hung Ting, New Taipei (TW); Kai-Chieh Chang, Kaohsiung (TW); Hsin-You Hou, New Taipei (TW)

(73) Assignee: Lixel Inc., Taipei (TW)

( * ) Notice: Subject to any disclaimer, the term of this patent is extended or adjusted under 35 U.S.C. 154(b) by 0 days.

(21) Appl. No.: 17/467,278

(22) Filed: Sep. 6, 2021

(65) Prior Publication Data

US 2022/0377310 A1 Nov. 24, 2022

(30) Foreign Application Priority Data

May 18, 2021 (TW) ................. 110117847

(51) Int. Cl.
*H04N 13/305* (2018.01)
*G09G 3/00* (2006.01)
*G02B 30/26* (2020.01)
*G02B 30/27* (2020.01)
*G02B 30/30* (2020.01)
*G09G 3/34* (2006.01)
*G02B 30/28* (2020.01)
*G09G 3/36* (2006.01)
*F21V 8/00* (2006.01)
*G02B 5/04* (2006.01)

(52) U.S. Cl.
CPC ........... *H04N 13/305* (2018.05); *G02B 30/26* (2020.01); *G02B 30/27* (2020.01); *G02B 30/28* (2020.01); *G02B 30/30* (2020.01); *G09G 3/342* (2013.01); *G02B 5/045* (2013.01); *G02B 6/0036* (2013.01); *G02B 6/0053* (2013.01); *G09G 3/003* (2013.01); *G09G 3/3611* (2013.01); *G09G 2320/028* (2013.01); *H04N 2213/001* (2013.01)

(58) Field of Classification Search
CPC .... H04N 13/305; H04N 13/31; H04N 13/317; G02B 30/26; G02B 30/27; G02B 30/28; G02B 30/29; G02B 30/30; G02B 30/36; G02B 6/005; G02B 6/0053; G09G 3/003
See application file for complete search history.

(56) References Cited

U.S. PATENT DOCUMENTS

| 2016/0282542 A1* | 9/2016 | Seo | G02B 30/30 |
| 2017/0219838 A1* | 8/2017 | Yang | G02B 30/36 |
| 2018/0107010 A1* | 4/2018 | Wang | G02B 30/29 |

FOREIGN PATENT DOCUMENTS

TW 201728963 A 8/2017

* cited by examiner

*Primary Examiner* — Xuemei Zheng
(74) *Attorney, Agent, or Firm* — Li & Cai Intellectual Property Office

(57) ABSTRACT

A stereoscopic image display device includes a flat panel display unit, a lens array unit, and a light guide structure unit. The light guide structure unit includes a light guide microstructure. The light guide microstructure is disposed on a side of the lens array unit. A bottom angle of the light guide microstructure is defined as B, and a bottom length of the light guide microstructure is defined as P. The bottom angle B and the bottom length P of the light guide microstructure satisfies following conditions: (i) 15.5 degrees≤B≤83.5 degrees; and (ii) 10 micrometers≤P≤2,000 micrometers, such that an oblique viewing angle of the stereoscopic image display device falls within a range from 10 degrees to 60 degrees.

10 Claims, 12 Drawing Sheets

100A

STEREOSCOPIC IMAGE DISPLAY DEVICE

CROSS-REFERENCE TO RELATED PATENT APPLICATION

This application claims the benefit of priority to Taiwan Patent Application No. 110117847, filed on May 18, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a stereoscopic image display device, and more particularly to a stereoscopic image display device that can enable a user to view a stereo image at an oblique viewing angle.

BACKGROUND OF THE DISCLOSURE

A conventional stereoscopic image display device can allow a user to view a stereo image at an oblique viewing angle through disposing a light guide element. However, there is still room for improvement in the conventional stereoscopic image display device in terms of the design of the light guide element, so that a stereo image with good image quality can be viewed by the user from the oblique viewing angle.

SUMMARY OF THE DISCLOSURE

In response to the above-referenced technical inadequacy, the present disclosure provides a stereoscopic image display device.

In one aspect, the present disclosure provides a stereoscopic image display device, which includes a flat panel display unit, a lens array unit, and a light guide structure unit. The flat panel display unit has a display surface. The lens array unit includes at least one condenser lens, and the at least one condenser lens is disposed on a side of the display surface of the flat panel display unit. The light guide structure unit includes at least one light guide microstructure, and the at least one light guide microstructure is disposed on a side of the lens array unit away from the flat panel display unit, or is disposed between the flat panel display unit and the lens array unit. A bottom angle of the at least one light guide microstructure is defined as B, a bottom length of the at least one light guide microstructure is defined as P, the bottom angle B and the bottom length P of the at least one light guide microstructure satisfies following conditions: (i) 15.5 degrees≤B≤83.5 degrees; and (ii) 10 micrometers≤P≤2,000 micrometers, such that an oblique viewing angle of the stereoscopic image display device falls within a range from 10 degrees to 60 degrees.

Preferably, the at least one light guide microstructure is a prism structure, the bottom angle of the at least one light guide microstructure is a bottom angle of the prism structure, and the bottom length of the at least one light guide microstructure is a bottom length of the prism structure.

Preferably, the bottom angle of the at least one light guide microstructure is designed according to a following formula:

$$OL\max = \arcsin\left(\left(Nd\sin\left(B - \arcsin\left(\frac{\sin(B - IL\max)}{Nd}\right)\right)\right)\Big/ N\text{out}\right).$$

B is the bottom angle of the at least one light guide microstructure; Nd is a refractive index of the at least one light guide microstructure itself; Nout is a refractive index of a medium that a light beam penetrates after the light beam exits from the at least one light guide microstructure; ILmax is an angle at which the light beam enters the at least one light guide microstructure with a maximum brightness; and OLmax is an angle at which the light beam exits the at least one light guide microstructure with a maximum brightness.

Preferably, Nd is between 1.40 and 1.65, Nout is between 1.0 and 2.0, and ILmax is between −60 degrees and +60 degrees; in which the bottom angle B is designed according to the above formula and falls between 15.5 degrees and 83.5 degrees, such that OLmax falls within the oblique viewing angle of between 10 degrees and 60 degrees.

Preferably, Nd is between 1.45 and 1.60, Nout is between 1.0 and 2.0, and ILmax is between −60 degrees and +60 degrees; in which the bottom angle B is designed according to the above formula and falls between 16.5 degrees and 79.5 degrees, such that OLmax falls within the oblique viewing angle of between 10 degrees and 60 degrees.

Preferably, in the light guide structure unit, a tip end of the at least one light guide microstructure is disposed in a direction toward the display surface; or the tip end of the at least one light guide microstructure is disposed in a direction away from the display surface.

Preferably, the light guide structure unit further includes a plurality of light guide microstructures, bottom angles of the plurality of light guide microstructures are respectively defined as a first bottom angle to an Nth bottom angle from a position close to a user toward a position away from the user, and the first bottom angle to the Nth bottom angle are increased or decreased within a range from 15.5 degrees to 83.5 degrees.

In another aspect, the present disclosure provides a stereoscopic image display device, which includes a flat panel display unit, a pinhole array unit, and a light guide structure unit. The flat panel display unit has a display surface. The pinhole array unit includes a main body and at least one pinhole penetrating through the main body, and the pinhole array unit is disposed on a side of the display surface of the flat panel display unit. The light guide structure unit includes at least one light guide microstructure, and the at least one light guide microstructure is disposed on a side of the pinhole array unit away from the flat panel display unit or is disposed between the flat panel display unit and the pinhole array unit. A bottom angle of the at least one light guide microstructure is defined as B, a bottom length of the at least one light guide microstructure is defined as P, the bottom angle B and the bottom length P of the at least one light guide microstructure satisfies following conditions: (i) 15.5 degrees≤B≤83.5 degrees; and (ii) 10 micrometers≤P≤2,000 micrometers, such that an oblique viewing angle of the stereoscopic image display device falls within a range from 10 degrees to 60 degrees.

In yet another aspect, the present disclosure provides a stereoscopic image display device, which includes a flat panel display module and a light guide structure unit. The flat panel display module includes a liquid crystal panel and a backlight unit. The liquid crystal panel has a display surface, the backlight unit is configured to project a light beam, and the liquid crystal panel is configured to enable the light beam to pass therethrough. The light guide structure unit includes at least one light guide microstructure, and the at least one light guide microstructure is disposed on a side of the liquid crystal panel away from the backlight unit or is disposed between the liquid crystal panel and the backlight unit. A bottom angle of the at least one light guide microstructure is defined as B, a bottom length of the at least one light guide microstructure is defined as P, the bottom angle B and the bottom length P of the at least one light guide microstructure satisfies following conditions: (i) $15.5$ degrees$\leq B \leq 83.5$ degrees; and (ii) $10$ micrometers$\leq P \leq 2,000$ micrometers, such that an oblique viewing angle of the stereoscopic image display device falls within a range from 10 degrees to 60 degrees.

Preferably, the liquid crystal panel selectively turns on a part of a plurality of pixels of the liquid crystal panel that are to be used and selectively turns off another part of the pixels of the liquid crystal panel that are not to be used, and the backlight unit includes a plurality of light sources, and the plurality of light sources are configured to project a plurality of light beams, such that the plurality of light beams pass through the part of the pixels of the liquid crystal panel that are to be used and are re-converged to generate a stereo image.

Therefore, by virtue of the special designs of the bottom angle B and the bottom length P of the light guide microstructure, the stereoscopic image display device can enable a user to view a high-quality stereo image from a better oblique viewing angle.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
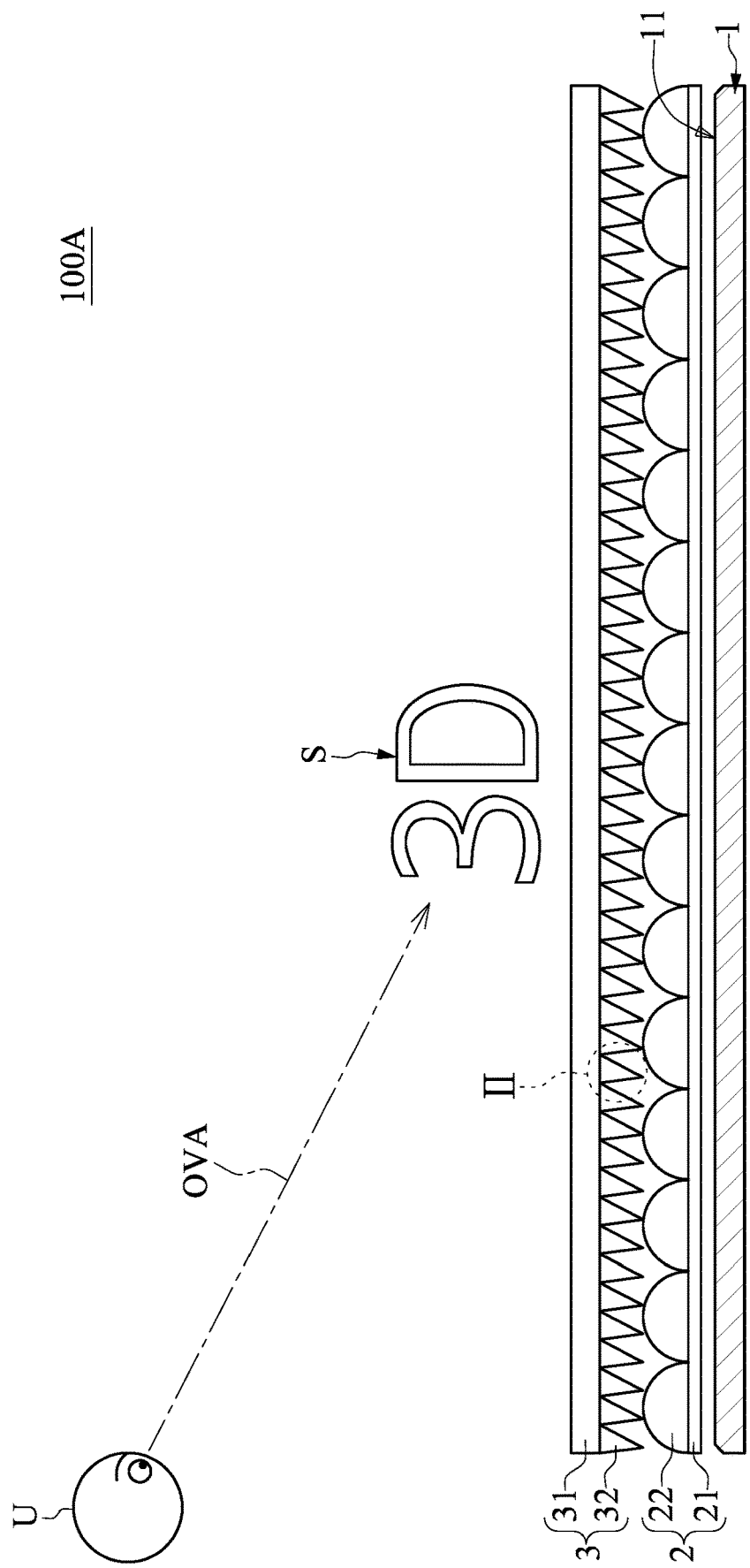
FIG. 1 is a schematic view showing a stereoscopic image display device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
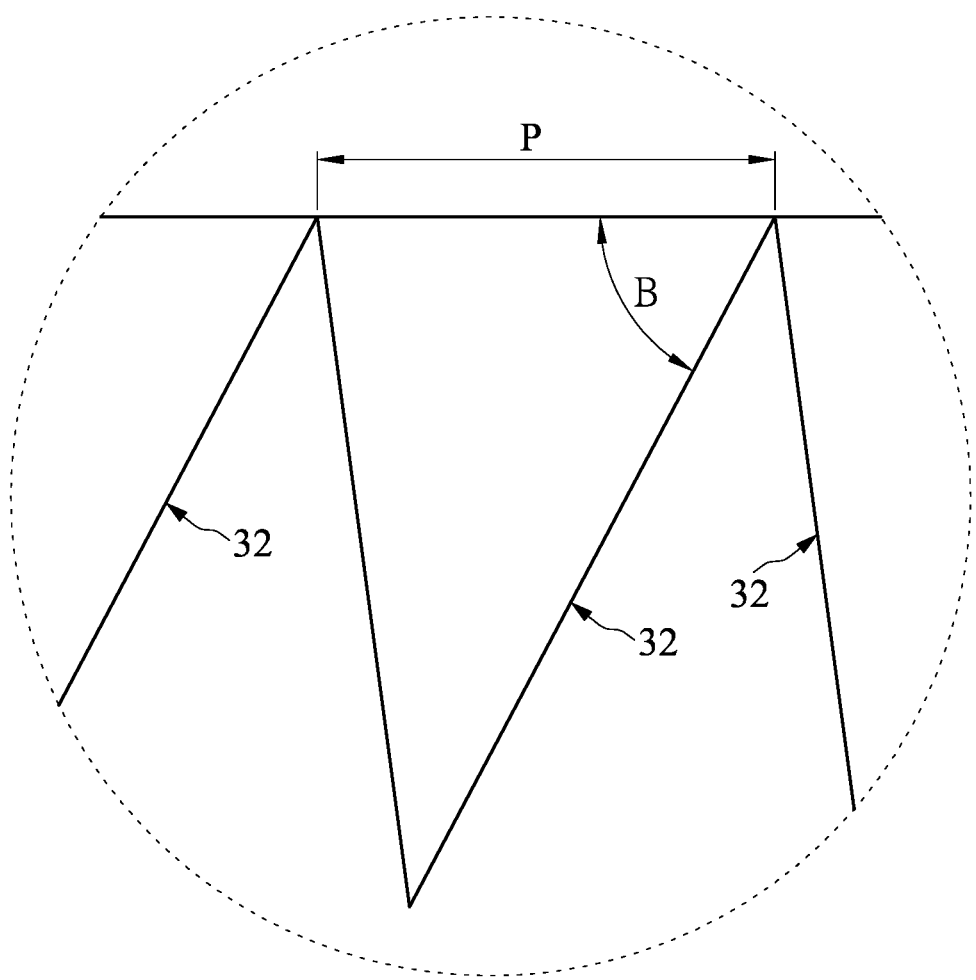
FIG. 2 is a first partially enlarged view of an area II in FIG. 1.

Referring to FIG. 1 and FIG. 2, a first embodiment of the present disclosure provides a stereoscopic image display device 100A. The stereoscopic image display device 100A can be applied in fields such as optoelectronics, medical treatment, military, exhibitions, displays, education, entertainment, and consumer electronics. The stereoscopic image display device 100A can be, for example, an active floating 3D image display device, which can display a stereo image S in a space above the stereoscopic image display device 100A. In addition, the stereoscopic image display device 100A can be installed on any suitable installation position such as a desktop, a floor, or a ceiling when in use.

More specifically, an objective according to the embodiment of the present disclosure is to provide a stereoscopic image display device 100A including a light guide structure with a specific specification, so that a user U can view a stereo image S displayed by the stereoscopic image display device 100A at a better oblique viewing angle (OVA), and the stereo image S has good image quality.

In order to achieve the above objective, as shown in FIG. 1, the stereoscopic image display device 100A according to the embodiment of the present disclosure includes a flat panel display unit 1, a lens array unit 2, and a light guide structure unit 3.

The flat panel display unit 1 has a display surface 11 (also referred to as display pixels). The lens array unit 2 is disposed on a side of the display surface 11 of the flat panel display unit 1. As shown in FIG. 1, the lens array unit 2 is disposed on an upper side of the display surface 11.

Figure 8:
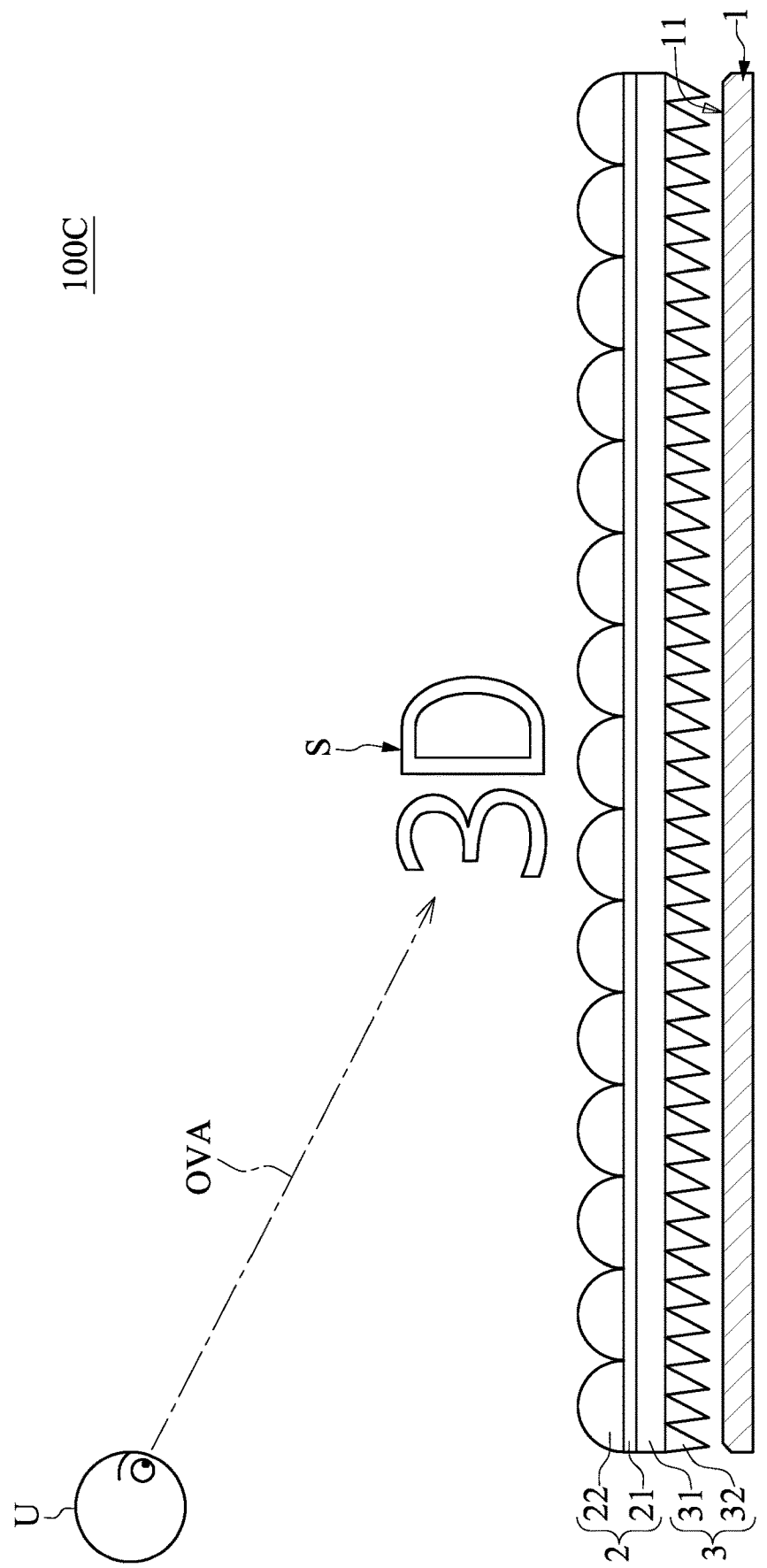
FIG. 8 is a schematic view showing a stereoscopic image display device according to a third embodiment of the present disclosure.

The light guide structure unit 3 is disposed on a side of the lens array unit 2 away from the display surface 11. As shown in FIG. 1, the light guide structure unit 3 is disposed on an upper side of the lens array unit 2, but the present disclosure is not limited thereto. For example, as shown in FIG. 8, the light guide structure unit 3 can also be, for example, disposed on a side of the lens array unit 2 adjacent to the display surface 11. In other words, the light guide structure unit 3 can be, for example, disposed on a lower side of the lens array unit 2 and located between the display surface 11 and the lens array unit 2.

When the stereoscopic image display device 100A is operated, the display surface 11 of the flat panel display unit 1 is configured to emit a light beam (also called light cluster) to generate an integral image. The light beam of the integral image can sequentially pass through the lens array unit 2 and the light guide structure unit 3.

The lens array unit 2 is configured to re-converge the integral image in a space above the stereoscopic image display device 100A to form a stereo image S. In addition, the light guide structure unit 3 is configured to adjust an angle and a direction of the light beam in a light field system of the stereoscopic image display device 100A, so that a user U can view the stereo image S at an oblique viewing angle OVA.

Further, the flat panel display unit 1 is used to display a pattern produced by an integral photography technology, and the flat panel display unit 1 further includes an arithmetic element used to execute algorithms (not shown in the drawings). In addition, the integral image displayed on the display surface 11 of the flat panel display unit 1 is generated by calculating and re-rendering a flat image, but the present disclosure is not limited thereto.

In some embodiments of the present disclosure, the display surface 11 of the flat panel display unit 1 can be, for example, display pixels of an active flat panel display. For example, the display surface 11 of the flat panel display unit 1 can be display pixels of a smart phone, display pixels of a tablet computer, or display pixels of a flat screen and so on. The type and structure of the flat panel display unit 1 is not limited in the present disclosure. The feature of the flat panel display unit 1 is to control the switching of stereo images to achieve the effect of dynamic picture display.

In some embodiments of the present disclosure, the display surface 11 of the flat panel display unit 1 can also be, for example, a flat pattern of a passive flat panel display. The passive flat panel display can only display a static pattern that cannot be freely changed. For example, the flat panel display unit 1 can be a light box drawing device, a photomask engraving device, or a printing drawing device, which can only display a static pattern.

Furthermore, the lens array unit 2 includes a base portion 21 and a plurality of condenser lenses 22 that are disposed on the base portion 21. The plurality of the condenser lenses 22 are arranged in a matrix arrangement or a staggered arrangement, and the plurality of the condenser lenses 22 have the ability to regulate the light field.

In some embodiments of the present disclosure, each of the condenser lenses 22 is made of a material with good optical characteristics. For example, the condenser lens 22 is made of the material selected from a group consisting of glass, poly (methyl methacrylate) (PMMA), polycarbonate (PC), and polyethylene (PE), but the present disclosure is not limited thereto. It should be noted that any material of the condenser lens 22 that has a light transmittance and a degree of softness and hardness suitable for forming a lens falls under the spirit and scope of the present disclosure.

In some embodiments of the present disclosure, the condenser lens 22 can be, for example, a biconvex lens, a plano-convex lens, or a Fresnel lens that has a light-condensing ability. Alternatively, the condenser lens 22 can also be, for example, a lenticular lens or a parallax barrier.

The light guide structure unit 3 has the ability to adjust the angle and direction of the light beam in the light field system. The light guide structure unit 3 includes a base portion 31 and a plurality of light guide microstructures 32 that are disposed on the base portion 31. In the present embodiment, the plurality of light guide microstructures 32 are arranged in a matrix arrangement or a staggered arrangement, but the present disclosure is not limited thereto. In order to enable a user U to view a stereo image S with good image quality at a better oblique viewing angle OVA, each of the light guide microstructures 32 according to the embodiment of the present disclosure is designed according to a specific specification.

As shown in FIG. 2, a bottom angle of each of the light guide microstructures 32 is defined as B, a bottom length of each of the light guide microstructures 32 is defined as P (also called pitch).

The bottom angle B and the bottom length P of each of the light guide microstructures 32 satisfies following conditions: (i) $15.5$ degrees$\leq B \leq 83.5$ degrees; and (ii) $10$ micrometers$\leq P \leq 2,000$ micrometers, such that an oblique viewing angle OVA of the stereoscopic image display device 100A falls within a range of between 10 degrees and 60 degrees.

In the present embodiment, each of the light guide microstructures 32 is a prism structure, the bottom angle B of each of the light guide microstructures 32 is a bottom angle of the prism structure, and the bottom length P of each of the light guide microstructures 32 is a bottom length of the prism structure, but the present disclosure is not limited thereto.

According to the above configuration, when the stereoscopic image display device 100A is operated, the stereoscopic image display device 100A enables a user U to view a floating stereo image S within the range of the oblique viewing angle OVA, and the floating stereo image can have better image quality.

It should be noted that, in the present embodiment, the oblique viewing angle OVA is designed to fall within the range of between 10 degrees and 60 degrees. If a viewing angle of the user is too small (i.e., less than 10 degrees), the viewing angle of the user will be too close to a frontal viewing angle, so that the stereo image viewed by the user is not perceived as a floating image. If the viewing angle of the user is too large (i.e., greater than 60 degrees), an equivalent viewing area of the user is too small, so that the stereo image viewed by the user cannot have better image quality. Accordingly, the stereoscopic image display device 100A according to the embodiment of the present disclosure is mainly designed by the special specifications of the bottom angle B and the bottom length P of the light guide microstructure 32, so that the stereoscopic image display device 100A can have the oblique viewing angle OVA within the range of between 10 degrees and 60 degrees.

Further, the bottom angle B of the light guide microstructure 32 is designed according to a following formula:

$$OL\max = \arcsin\left(\left(Nd\sin\left(B - \arcsin\left(\frac{\sin(B - IL\max)}{Nd}\right)\right)\right)/N\text{out}\right).$$

Figure 3:
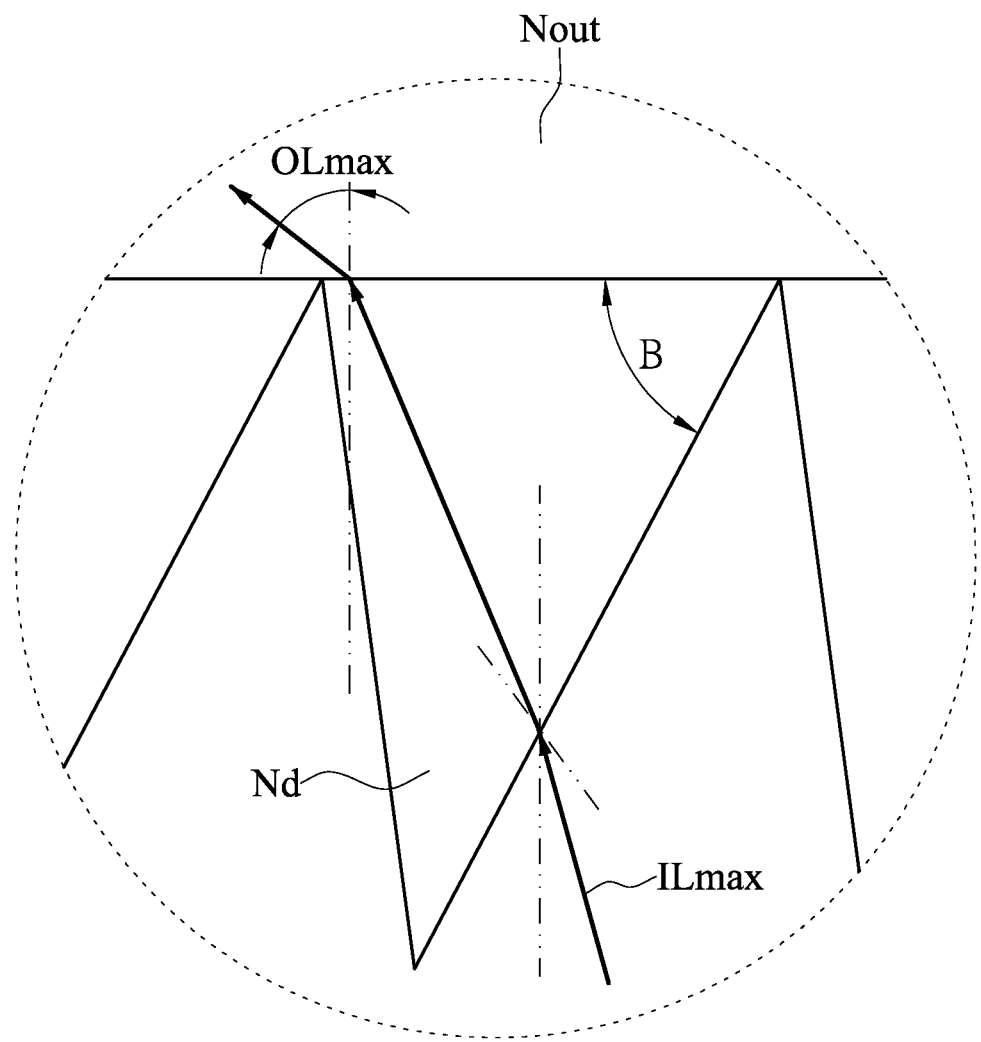
FIG. 3 is a second partially enlarged view of the area II in FIG. 1.

The optical parameters defined in the above formula are shown in FIG. 3 and explained as follows.

B is the bottom angle of the light guide microstructure (i.e., an included angle of an exit surface of the light guide microstructure away from the user). Nd is a refractive index of the light guide microstructure itself. Nout is a refractive index of a medium that a light beam penetrates after the light beam exits from the light guide microstructure. ILmax is an angle at which the light beam enters the light guide microstructure with a maximum brightness. OLmax is an angle at which the light beam exits the light guide microstructure with a maximum brightness.

In a preferred embodiment of the present disclosure, the refractive index Nd of the light guide microstructure itself is between 1.40 and 1.65. The refractive index Nout of the medium that the light beam penetrates after the light beam exits from the light guide microstructure is between 1.0 and 2.0. The angle ILmax at which the light beam enters the light guide microstructure with the maximum brightness is between −60 degrees and +60 degrees. According to the above configuration, if the angle OLmax at which the light beam exits the light guide microstructure with the maximum brightness is required to fall within the oblique viewing angle OVA range of between 10 degrees and 60 degrees, and if the refractive index Nd of the light guide microstructure itself being between 1.40 and 1.65 is taken into consideration, the bottom angle B of the light guide microstructure is designed to fall between 15.5 degrees and 83.5 degrees according to the above formula.

Figure 4:
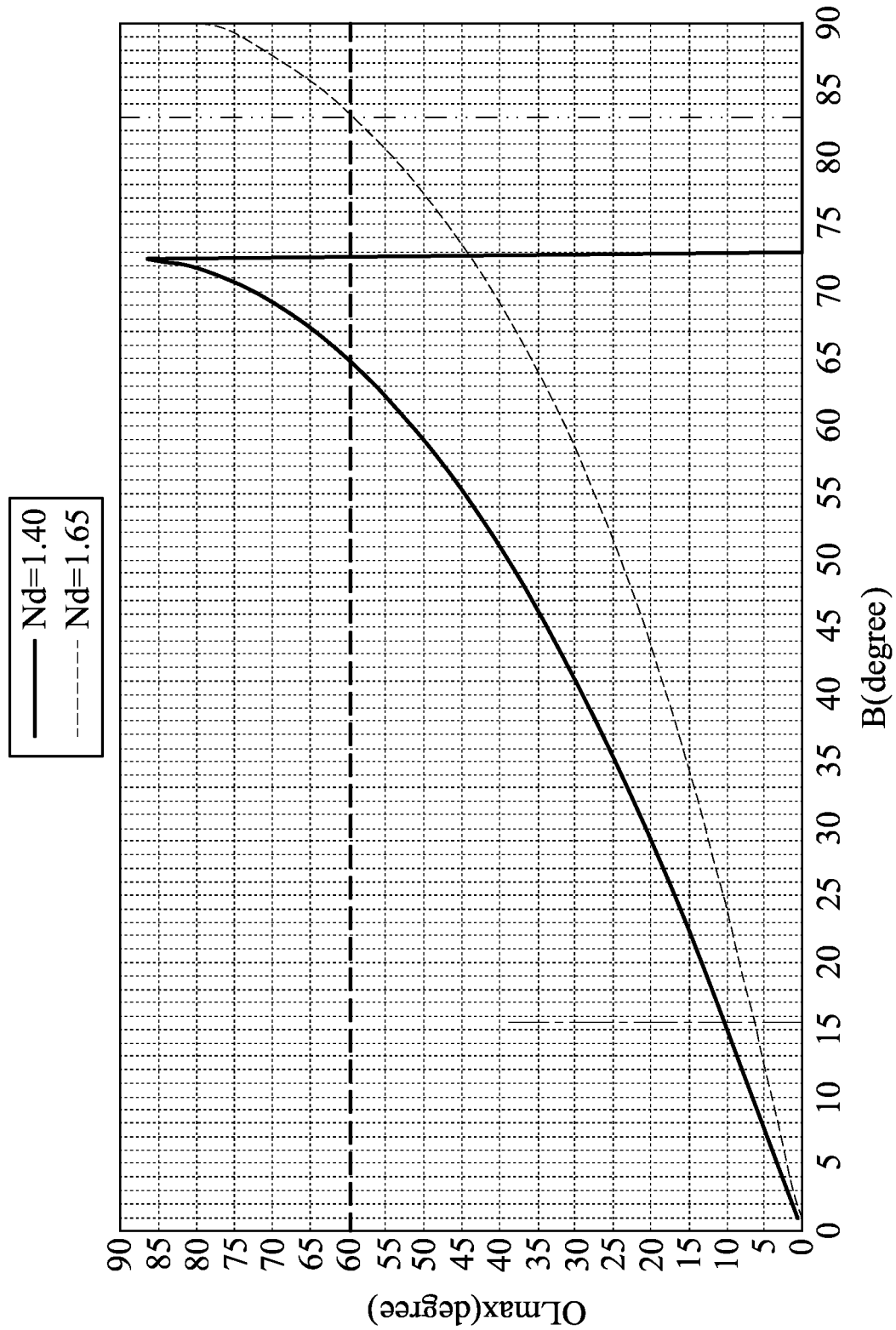
FIG. 4 shows a relationship between a bottom angle B of a light guide microstructure and an angle OLmax at which a light beam exits the light guide microstructure with a maximum brightness when a refractive index Nd of the light guide microstructure itself is 1.40 or 1.65.

FIG. 4 shows a relationship between the bottom angle B of the light guide microstructure and the angle OLmax at which the light beam exits the light guide microstructure with the maximum brightness when the refractive index Nd of the light guide microstructure itself is 1.40 or 1.65.

In a preferred embodiment of the present disclosure, the refractive index Nd of the light guide microstructure itself is between 1.45 and 1.60. The refractive index Nout of the medium that the light beam penetrates after the light beam exits from the light guide microstructure is between 1.0 and 2.0. The angle ILmax at which the light beam enters the light guide microstructure with the maximum brightness is between −60 degrees and +60 degrees. According to the above configuration, if the angle OLmax at which the light beam exits the light guide microstructure with the maximum brightness is required to fall within the oblique viewing angle OVA range of between 10 degrees and 60 degrees, and if the refractive index Nd of the light guide microstructure itself being between 1.45 and 1.60 is taken into consideration, the bottom angle B of the light guide microstructure is designed to fall between 16.5 degrees and 79.5 degrees according to the above formula.

Figure 5:
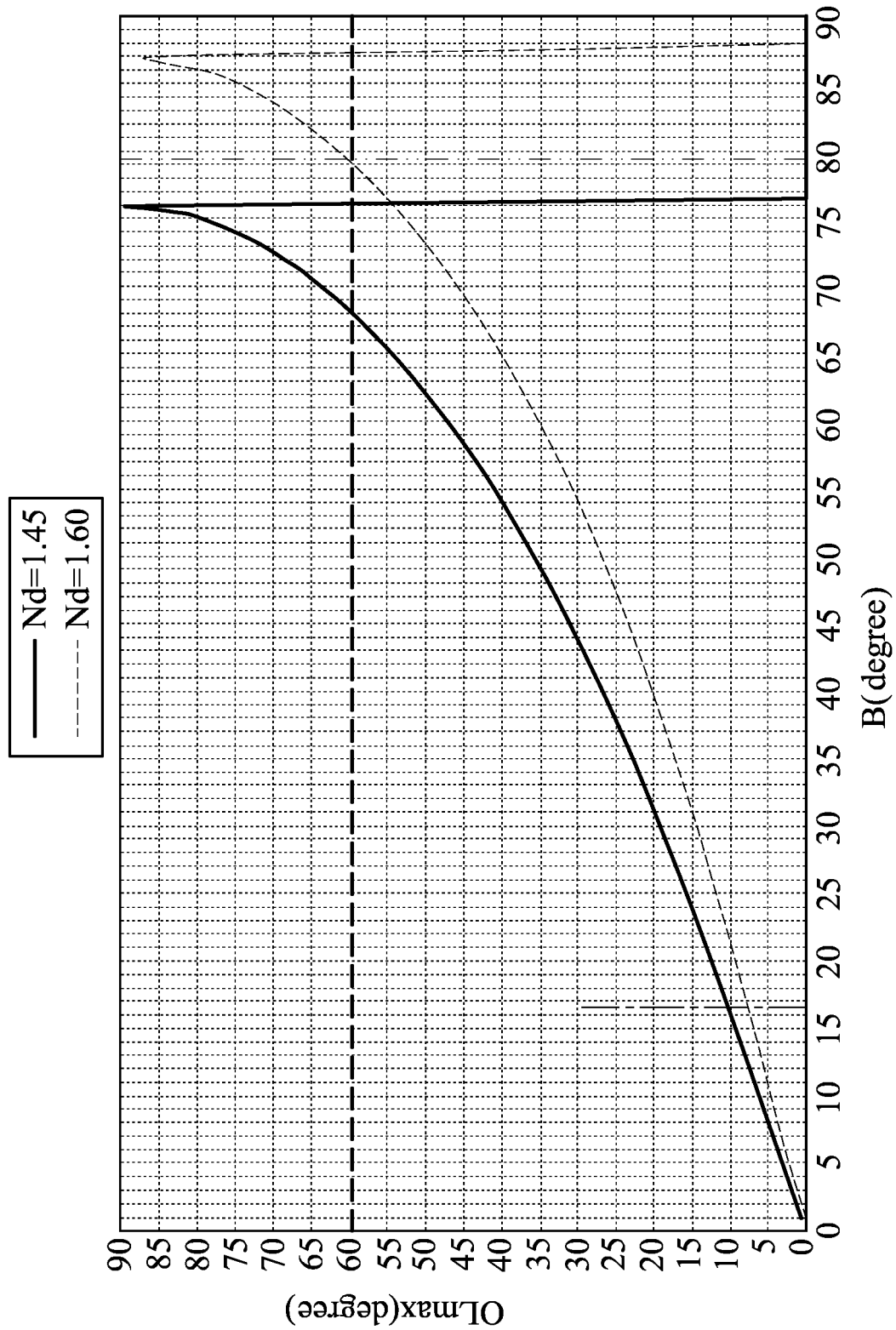
FIG. 5 shows the relationship between the bottom angle B of the light guide microstructure and the angle OLmax at which the light beam exits the light guide microstructure with the maximum brightness when the refractive index Nd of the light guide microstructure itself is 1.45 or 1.60.

FIG. 5 shows the relationship between the bottom angle B of the light guide microstructure and the angle OLmax at which the light beam exits the light guide microstructure with the maximum brightness when the refractive index Nd of the light guide microstructure itself is 1.45 or 1.60.

The formula satisfied by the bottom angle B of the light guide microstructure 32 can be derived from following derivation step 1 and derivation step 2.

The derivation step 1 is: $\Theta' = \arcsin(\sin(B - IL\max)/Nd)$.

The derivation step 2 is: substituting $\Theta'$ into the following formula.

$$OL\max = \arcsin((Nd \sin(B - \Theta'))/N\text{out}).$$

After the derivation step 2 is calculated, the following formula can be obtained:

$$OL\max = \arcsin\left(\left(Nd\sin\left(B - \arcsin\left(\frac{\sin(B - IL\max)}{Nd}\right)\right)\right)/N\text{out}\right).$$

Furthermore, the bottom length P of the light guide microstructure 32 is preferably between 10 micrometers and 2,000 micrometers, and more preferably between 15 micrometers and 1,500 micrometers.

It is worth mentioning that, the bottom length P of the light guide microstructure 32 must be not less than 10 micrometers after a verification of an optical simulation software. If the bottom length P of the light guide microstructure 32 is less than 10 micrometers, the light field system of the stereoscopic image display device 100A can cause a serious degradation in the image quality of the stereo image due to diffraction and aberration. In addition, based on a separate arrangement of RGB pixels of the display surface, the light field system of the stereoscopic image display device 100A can cause a dispersion of the stereo image to be more serious. Accordingly, the bottom length P of the light guide microstructure 32 must be not less than 10 micrometers to effectively avoid aforementioned diffraction and aberration. The optical simulation software can be, for example, ASAP™, Zemax™, Lighttools™, RSoft™, Code v™, or TracePro™. The method of above-mentioned verification can be, for example, simulated by a diffraction coefficient F formula: Lambda=550 nm, which includes calculating a relationship between the diffraction coefficient F, a distance from light point to prism L, and a distance from prism to image surface. Further, the calculation system of the bottom length P (i.e., a pitch of prism) based on different light guide microstructures uses Fraunhofer diffraction, which has a diffraction similar to that of a far field. A destruction result of Modulation Transfer Function (MTF) of an image resolution can be obtained by simulating a diffraction fringe of the far-field.

It is worth mentioning that, as shown in FIG. 1, the light guide structure unit 3 of the present embodiment is disposed in a reverse manner. That is, the plurality of light guide microstructures 32 of the light guide structure unit 3 are disposed on a lower side and close to the lens array unit 2, and tip ends of the plurality of light guide microstructures 32 are disposed in a direction toward the lens array unit 2. Furthermore, the base portion 31 of the light guide structure unit 3 is disposed on an upper side and away from the lens array unit 2, but the present disclosure is not limited thereto.

Figure 6:
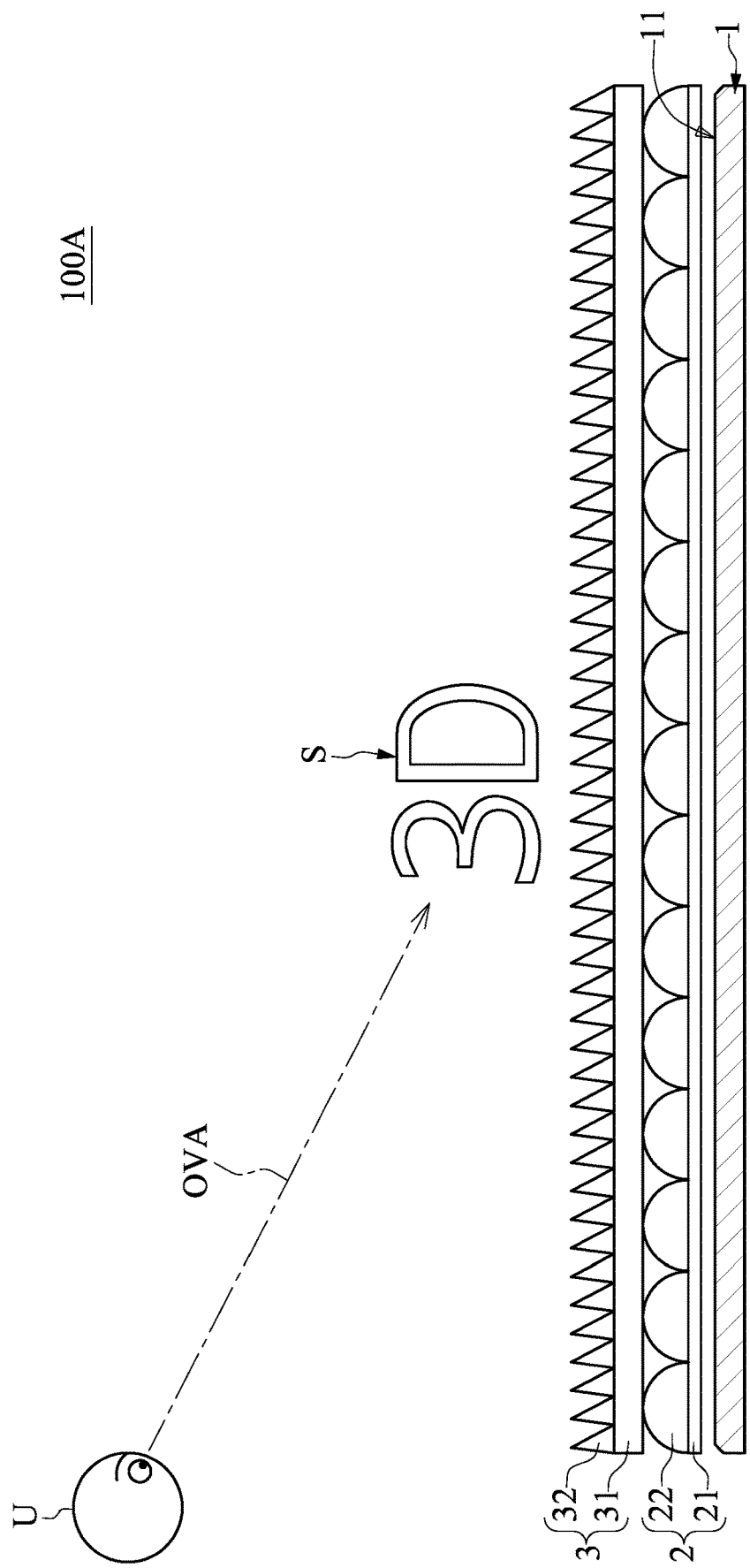
FIG. 6 is a schematic view showing a light guide structure unit being disposed in a forward manner.

For example, as shown in FIG. 6, the light guide structure unit 3 can be disposed in a forward manner. That is, the plurality of light guide microstructures 32 of the light guide structure unit 3 are disposed on the upper side and away from the lens array unit 2, and the tip ends of the plurality of light guide microstructures 32 are disposed in a direction away from the lens array unit 2. Furthermore, the base portion 31 of the light guide structure unit 3 is disposed on the lower side.

Second Embodiment

Figure 7:
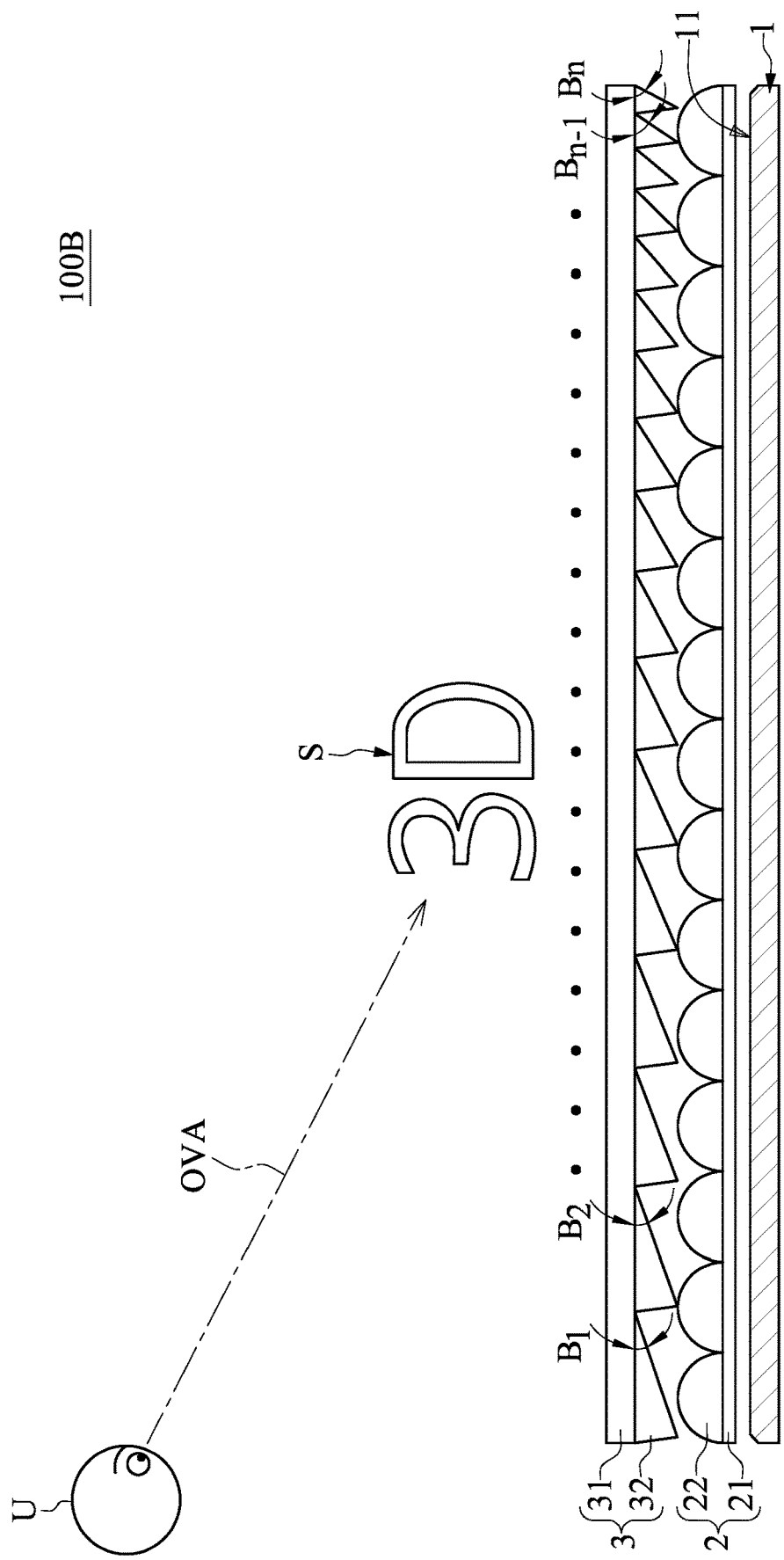
FIG. 7 is a schematic view showing a stereoscopic image display device according to a second embodiment of the present disclosure.

As shown in FIG. 7, a second embodiment of the present disclosure provides a stereoscopic image display device 100B. The stereoscopic image display device 100B of the present embodiment is substantially the same as that of the above-mentioned first embodiment. The main difference is that the design of the light guide structure unit 3 of the stereoscopic image display device 100B of the present embodiment is slightly different from that in the above-mentioned first embodiment.

More specifically, in the light guide structure unit 3, the bottom angles B of the plurality of light guide microstructures 32 (i.e., included angles of exit surfaces of the light guide microstructures 32 away from a user U) are respectively defined as a first bottom angle $B_1$ to an Nth bottom angle $B_N$ from a position close to the user U toward a position away from the user U. The first bottom angle $B_1$ to the Nth bottom angle $B_N$ gradually increases. For example, the first bottom angle $B_1$ can be 15.5 degrees, the Nth bottom angle $B_N$ can be 83.5 degrees, and the bottom angles $B_2$ to $B_{N-1}$ between the first bottom angle $B_1$ and the Nth bottom angle $B_N$ are gradually increased between 15.5 degrees and 83.5 degrees, but the present disclosure is not limited thereto. In an embodiment not shown in the present disclosure, the bottom angles $B_2$ to $B_{N-1}$ between the first bottom angle $B_1$ and the Nth bottom angle $B_N$ can be gradually decreased between 15.5 degrees and 83.5 degrees.

It is worth mentioning that, if the stereoscopic image display device 100B adopts a large-sized flat panel (i.e., a flat panel greater than 40 inches), viewing angle differences of the stereoscopic image display device 100B at different positions of the flat panel can be too large, so that a stereo image S can have a problem of poor image quality. In order to solve the above-mentioned technical problems, the stereoscopic image display device 100B of the present embodiment is designed with gradually changing bottom angles $B_1$ to $B_N$ in the light guide structure unit 3, so as to meet practical requirements of the large-sized flat panel.

Third Embodiment

As shown in FIG. 8, a third embodiment of the present disclosure provides a stereoscopic image display device 100C. The stereoscopic image display device 100C of the present embodiment is substantially the same as that of the above-mentioned first embodiment. The difference is that the light guide structure unit 3 of the above-mentioned first embodiment is disposed on an upper side of the lens array unit 2. As shown in FIG. 8, the light guide structure unit 3 of the present embodiment is disposed on a side of the lens array unit 2 adjacent to the display surface 11. In other words, the light guide structure unit 3 is disposed on a lower side of the lens array unit 2 and located between the display surface 11 and the lens array unit 2.

Fourth Embodiment

Figure 9:
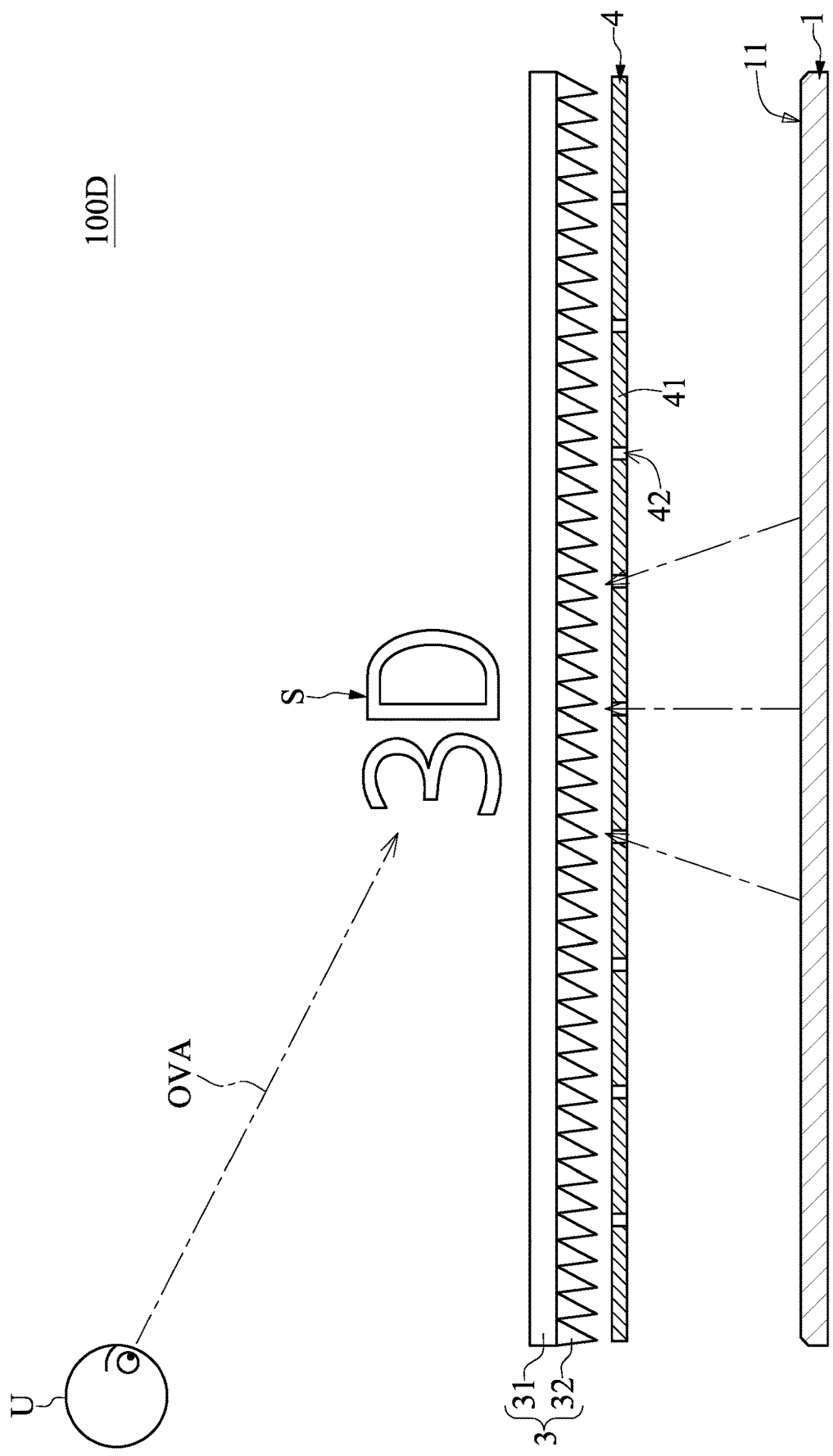
FIG. 9 is a schematic view showing a stereoscopic image display device according to a fourth embodiment of the present disclosure.

As shown in FIG. 9, a fourth embodiment of the present disclosure provides a stereoscopic image display device 100D. The stereoscopic image display device 100D of the present embodiment is substantially the same as that of the above-mentioned first embodiment. The difference is that the stereoscopic image display device 100D of the present embodiment adopts a pinhole array unit 4 in replacement of the lens array unit 2 in the first embodiment.

More specifically, the stereoscopic image display device 100D of the present embodiment includes a flat panel display unit 1, a pinhole array unit 4, and a light guide structure unit 3.

The pinhole array unit 4 is disposed adjacent to a display surface 11 of the flat panel display unit 1. In other words, the pinhole array unit 4 is disposed above the display surface 11 of the flat panel display unit 1. The pinhole array unit 4 can be in contact with the display surface 11 of the flat panel display unit 1. Alternatively, the pinhole array unit 4 can also be spaced apart from the display surface 11 of the flat panel display unit 1. The present disclosure is not limited thereto.

The flat panel display unit 1 is disposed in the lowermost layer of the stereoscopic image display device 100D. The flat panel display unit 1 is configured to display a flat image that has not been reconstructed by light, and light beams of the flat image are capable of passing through the pinhole array unit 4 to achieve redistribution and reconstruction, so as to display a stereo image that is reconstructed.

The pinhole array unit 4 is disposed between the flat panel display unit 1 and the light guide structure unit 3. The pinhole array unit 4 has an ability of controlling light field system. The pinhole array unit 4 is configured to adjust a light angle of a stereoscopic object, so that the flat image that has not been reconstructed is redistributed and reconstructed, so as to enable a user U to view the stereo image S.

Furthermore, the pinhole array unit 4 includes a main body 41 and a plurality of pinholes 42. The main body 41 is made of an opaque material, so that the main body is an opaque object. The main body 41 has a plate shape, and the plurality of pinholes 42 are preferably circular holes, but the present disclosure is not limited thereto. The plurality of pinholes 42 are formed in the main body 41, and penetrate through two opposite side surfaces of the main body 41.

In some embodiments of the present disclosure, a distance between any two adjacent pinholes 42 is less than 5 mm, a diameter of each of the pinholes 42 is less than 1 mm, and each of the pinholes 42 has a light focusing ability. The unreconstructed image displayed by the display surface 11 of the flat panel display unit 1 is configured to be reconstructed to form the stereo image S through the plurality of pinholes 42 based on the pinhole principle. Each of the pinholes 42 can be hollow. Each of the pinholes 42 can also be filled with a transparent material, so that the light beams can respectively pass through the plurality of pinholes 42. The plurality of pinholes 42 can be arranged in a rectangular shape or a hexagonal shape, for example. In other words, the pinholes 42 in any two adjacent rows can be arranged in a relative arrangement or a staggered arrangement.

The light guide structure unit 3 is disposed on a side of the pinhole array unit 4 away from the display surface 11. As shown in FIG. 9, the light guide structure unit 3 is disposed on an upper side of the pinhole array unit 4, but the present disclosure is not limited thereto.

In general, when the stereoscopic image display device 100D is operated, the display surface 11 of the flat panel display unit 1 emits the light beams to generate an integral image. The light beams of the integral image can sequentially pass through the pinhole array unit 4 and the light guide structure unit 3.

The pinhole array unit 4 is configured to re-converge the integral image in a space above the stereoscopic image display device 100D, so as to form a stereo image. Furthermore, the light guide structure unit 3 is configured to adjust the angle and direction of the light beams in the light field system, so that the stereo image S can be viewed by a user U at an oblique viewing angle.

The light guide structure unit 3 has the ability to adjust the angle and direction of the light beams in the light field system. More specifically, the light guide structure unit 3 includes a base portion 21 and a plurality of light guide microstructures 31 disposed on the base portion 21. In order to enable a user U to view a stereo S with a good image quality at a better oblique viewing angle OVA, each of the light guide microstructures 32 according to the embodiment of the present disclosure is designed according to a specific specification.

The specification design of each of the light guide microstructures 32 is substantially the same as that of the above-mentioned first embodiment, and will not be reiterated herein.

Fifth Embodiment

Figure 10:
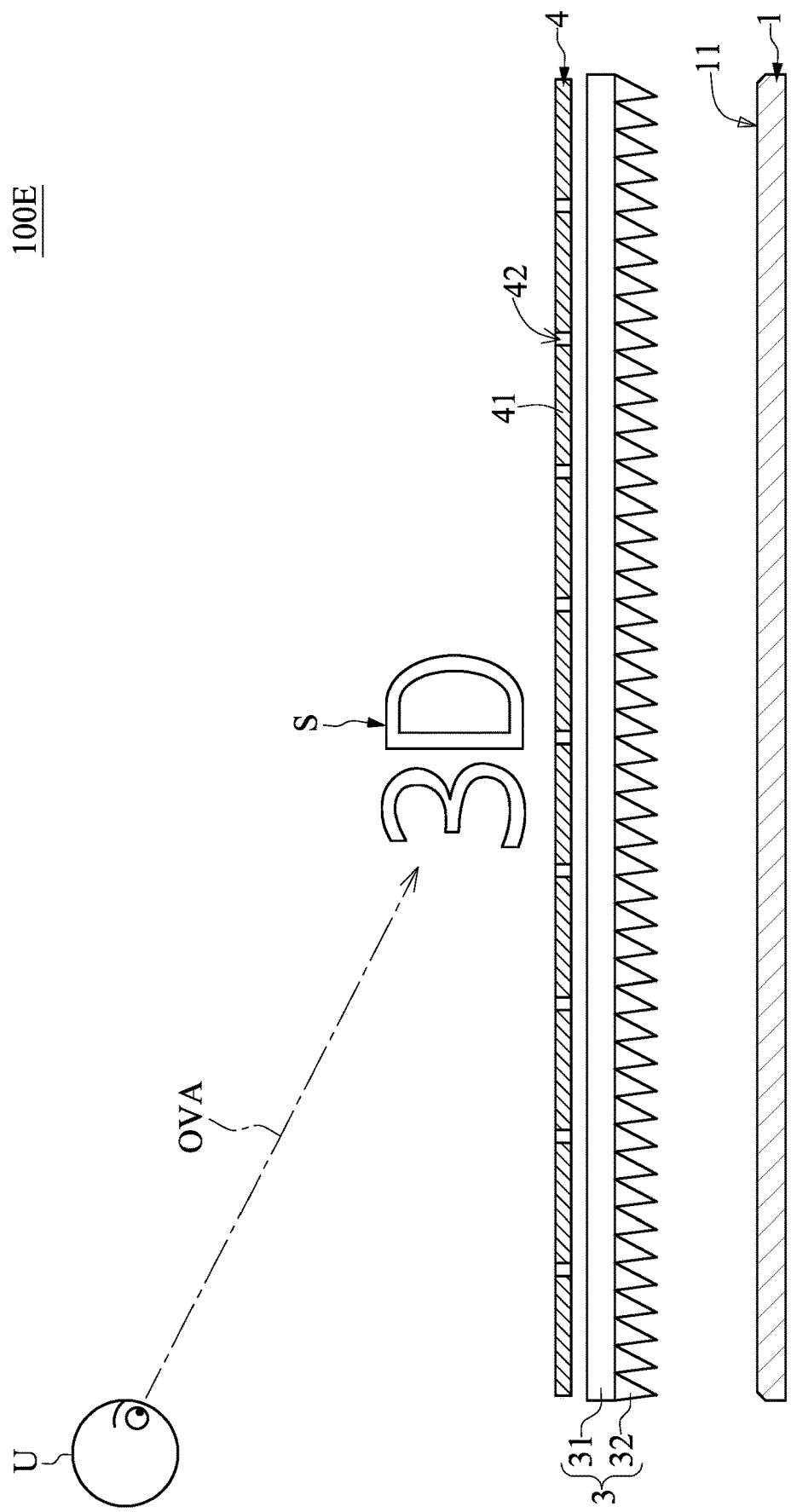
FIG. 10 is a schematic view showing a stereoscopic image display device according to a fifth embodiment of the present disclosure.

As shown in FIG. 10, a fifth embodiment of the present disclosure provides a stereoscopic image display device 100E. The stereoscopic image display device 100E of the present embodiment is substantially the same as that of the above-mentioned fourth embodiment. The difference is that the light guide structure unit 3 of the above-mentioned fourth embodiment is disposed on an upper side of the pinhole array unit 4. As shown in FIG. 10, the light guide structure unit 3 of the present embodiment is disposed on a side of the pinhole array unit 4 adjacent to the display surface 11. In other words, the light guide structure unit 3 is disposed on a lower side of the pinhole array unit 4 and located between the display surface 11 and the pinhole array unit 4.

Sixth Embodiment

Figure 11:
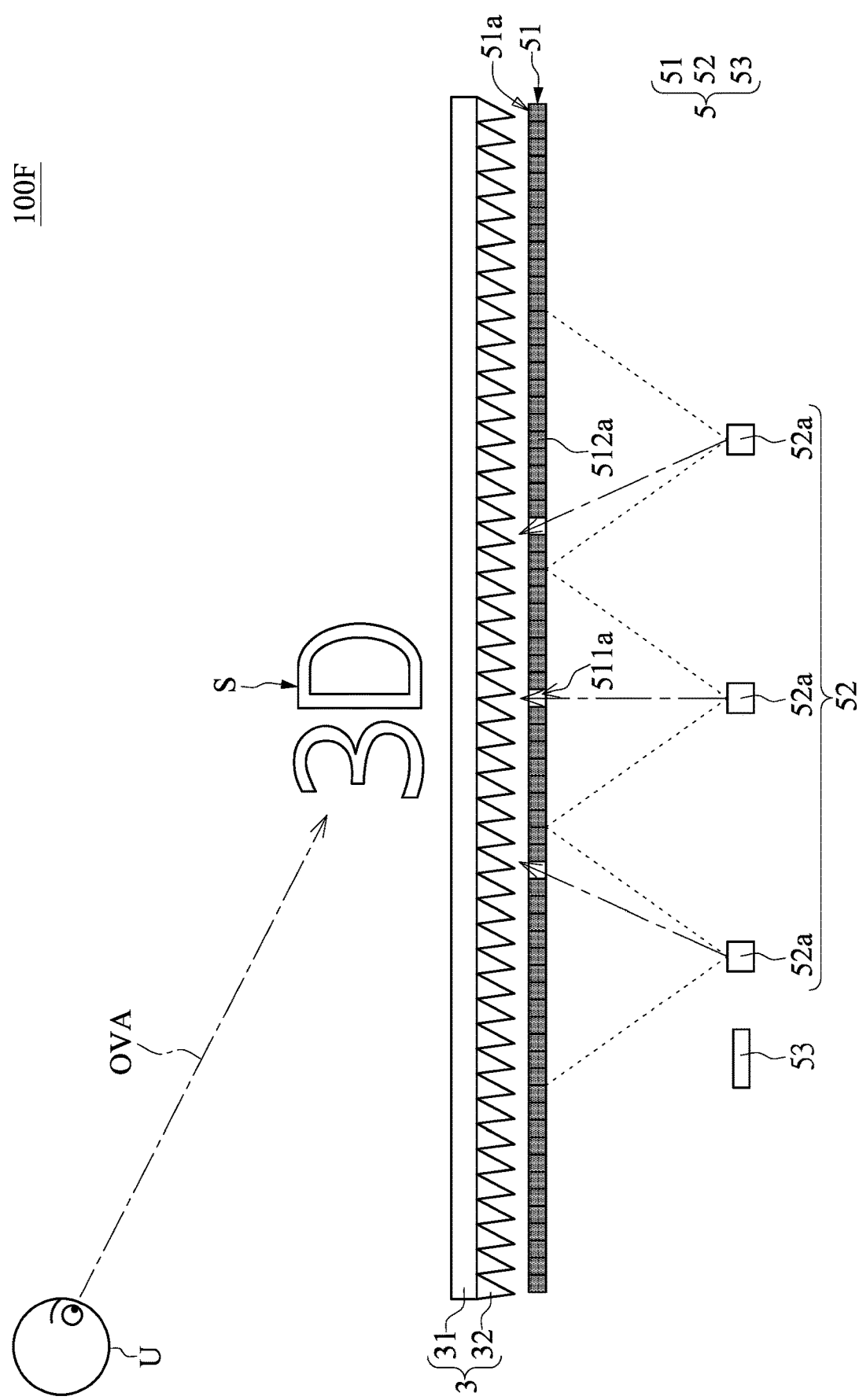
FIG. 11 is a schematic view showing a stereoscopic image display device according to a sixth embodiment of the present disclosure.

As shown in FIG. 11, a sixth embodiment of the present disclosure provides a stereoscopic image display device 100F. The stereoscopic image display device 100F of the present embodiment is substantially the same as that of the above-mentioned first embodiment. The difference is that the stereoscopic image display device 100F of the present embodiment is operated in a multi-light source mode.

More specifically, the stereoscopic image display device 100F of the present embodiment includes a flat panel display module 5 and a light guide structure unit 3 disposed on the flat panel display module 5.

The flat panel display module 5 includes a liquid crystal panel 51, a backlight unit 52, and an arithmetic unit 53. The liquid crystal panel 51 has a display surface 51a, and the backlight unit 52 is configured to project a light beam, so that the light beam passes through the liquid crystal panel 51 and transmits information to the eyes of a user U. In the present embodiment, the liquid crystal panel 51 is configured to selectively turn on a part of the pixels 511a of the liquid crystal panel 51 that need to be used and selectively turn off another part of the pixels 512a of the liquid crystal panel 51 that does not need to be used through an algorithm of the arithmetic unit 53.

The backlight unit 52 includes a plurality of light sources 52a. The plurality of light sources 52a can be, for example, LED light sources or OLED light sources. The plurality of light sources 52a are spaced apart from each other, and the plurality of light sources 52a can provide a function such as the pinhole array unit. The plurality of light sources 52a are configured to project light beams, so that the light beams can pass through the liquid crystal panel 51 and transmit information to the eyes of the user U. The flat image of the flat panel display module 5 can pass through the plurality of the light sources 52a and the liquid crystal panel 51, so as to display the reorganized stereo image S.

The light guide structure unit 3 is disposed on a side of the display surface 51a of the liquid crystal panel 51. That is, the light guide structure unit 3 is disposed on a side of the liquid crystal panel 51 away from the backlight unit 52.

In general, when the stereoscopic image display device 100F is operated, the plurality of light sources 52a of the backlight unit 52 are configured to emit light beams, and the light beams can sequentially pass through the liquid crystal panel 51 and the light guide structure unit 3. The liquid crystal panel 51 is configured to re-converge the light beams in a space above the stereoscopic image display device 100F to form a stereo image S. Furthermore, the light guide structure unit 3 is configured to adjust the angle and direction of the light beams in the light field system, so that a user U can view the stereo image S at an oblique viewing angle OVA.

The specification design of the light guide structure unit 3 is substantially the same as that of the above-mentioned first embodiment, and will not be reiterated herein.

Seventh Embodiment

Figure 12:
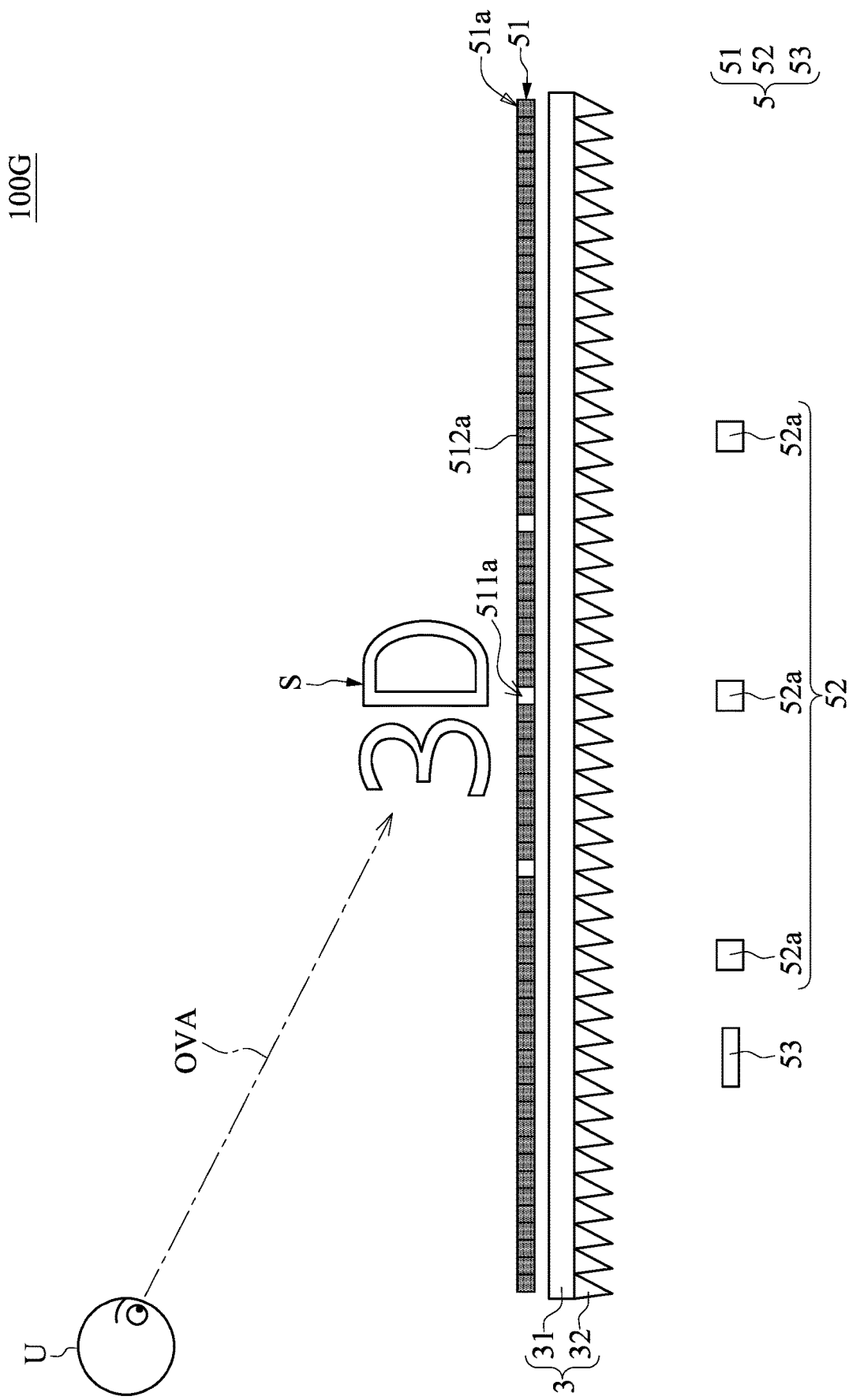
FIG. 12 is a schematic view showing a stereoscopic image display device according to a seventh embodiment of the present disclosure.

As shown in FIG. 12, a seventh embodiment of the present disclosure provides a stereoscopic image display device 100G. The stereoscopic image display device 100G of the present embodiment is substantially the same as that of the above-mentioned sixth embodiment. The difference is that the light guide structure unit 3 of the sixth embodiment described above is disposed on a side of the display surface 51a of the liquid crystal panel 51.

As shown in FIG. 12, the light guide structure unit 3 of the present embodiment is disposed between the liquid crystal panel 51 and the backlight unit 52. Accordingly, when the stereoscopic image display device 100G is operated, the plurality of light sources 521 of the backlight unit 52 are configured to emit light beams, and the light beams can sequentially pass through the light guide structure unit 3 and the liquid crystal panel 51.

The light guide structure unit 3 is configured to adjust the angle and direction of the light beams in the light field system, and the liquid crystal panel 51 is configured to re-converge the light beams in a space above the stereoscopic image display device 100G, so that a user U can view the stereo image S at an oblique viewing angle OVA.

Beneficial Effects of the Embodiments

In conclusion, by virtue of the special designs of the bottom angle B and the bottom length P of the light guide microstructure, the stereoscopic image display device can enable a user to view a high-quality stereo image at a better oblique viewing angle.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A stereoscopic image display device, comprising:
a flat panel display unit having a display surface;
a lens array unit including at least one condenser lens, the at least one condenser lens being disposed on a side of the display surface of the flat panel display unit; and
a light guide structure unit including at least one light guide microstructure, the at least one light guide microstructure being disposed on a side of the lens array unit away from the flat panel display unit, or being disposed between the flat panel display unit and the lens array unit;
wherein a bottom angle of the at least one light guide microstructure is defined as B, a bottom length of the at least one light guide microstructure is defined as P, the bottom angle B and the bottom length P of the at least one light guide microstructure satisfies following conditions: (i) 15.5 degrees≤B≤83.5 degrees; and (ii) 10 micrometers≤P≤2,000 micrometers, such that an oblique viewing angle of the stereoscopic image display device falls within a range from 10 degrees to 60 degrees.

2. The stereoscopic image display device according to claim 1, wherein the at least one light guide microstructure is a prism structure, the bottom angle of the at least one light guide microstructure is a bottom angle of the prism structure, and the bottom length of the at least one light guide microstructure is a bottom length of the prism structure.

3. The stereoscopic image display device according to claim 1, wherein the bottom angle of the at least one light guide microstructure is designed according to a following formula:

$$OL\max = \arcsin\left(\left(Nd\sin\left(B - \arcsin\left(\frac{\sin(B - IL\max)}{Nd}\right)\right)\right) / N\text{out}\right);$$

wherein B is the bottom angle of the at least one light guide microstructure; Nd is a refractive index of the at least one light guide microstructure itself; Nout is a refractive index of a medium that a light beam penetrates after the light beam exits from the at least one light guide microstructure; ILmax is an angle at which the light beam enters the at least one light guide microstructure with a maximum brightness; and OLmax is an angle at which the light beam exits the at least one light guide microstructure with a maximum brightness.

4. The stereoscopic image display device according to claim 3, wherein Nd is between 1.40 and 1.65, Nout is between 1.0 and 2.0, and ILmax is between −60 degrees and +60 degrees; wherein the bottom angle B is designed according to the formula in claim 3 and falls between 15.5 degrees and 83.5 degrees, such that OLmax falls within the oblique viewing angle of between 10 degrees and 60 degrees.

5. The stereoscopic image display device according to claim 3, wherein Nd is between 1.45 and 1.60, Nout is between 1.0 and 2.0, and ILmax is between −60 degrees and +60 degrees; wherein the bottom angle B is designed according to the formula in claim 3 and falls between 16.5 degrees and 79.5 degrees, such that OLmax falls within the oblique viewing angle of between 10 degrees and 60 degrees.

6. The stereoscopic image display device according to claim 1, wherein, in the light guide structure unit, a tip end of the at least one light guide microstructure is disposed in a direction toward the display surface; or the tip end of the at least one light guide microstructure is disposed in a direction away from the display surface.

7. The stereoscopic image display device according to claim 1, wherein the light guide structure unit further includes a plurality of light guide microstructures, bottom angles of the plurality of light guide microstructures are respectively defined as a first bottom angle to an Nth bottom angle from a position close to a user toward a position away from the user, and the first bottom angle to the Nth bottom angle are increased or decreased within a range from 15.5 degrees to 83.5 degrees.

8. A stereoscopic image display device, comprising:
a flat panel display unit having a display surface;
a pinhole array unit including a main body and at least one pinhole penetrating through the main body, the pinhole array unit being disposed on a side of the display surface of the flat panel display unit, and
a light guide structure unit including at least one light guide microstructure, the at least one light guide microstructure being disposed on a side of the pinhole array unit away from the flat panel display unit, or being disposed between the flat panel display unit and the pinhole array unit;
wherein a bottom angle of the at least one light guide microstructure is defined as B, a bottom length of the at least one light guide microstructure is defined as P, the bottom angle B and the bottom length P of the at least one light guide microstructure satisfies following conditions: (i) 15.5 degrees≤B≤83.5 degrees; and (ii) 10 micrometers≤P≤2,000 micrometers, such that an oblique viewing angle of the stereoscopic image display device falls within a range from 10 degrees to 60 degrees.

9. A stereoscopic image display device, comprising:
a flat panel display module including a liquid crystal panel and a backlight unit; wherein the liquid crystal panel has a display surface, the backlight unit is configured to project a light beam, and the liquid crystal panel is configured to enable the light beam to pass therethrough; and
a light guide structure unit including at least one light guide microstructure, the at least one light guide microstructure being disposed on a side of the liquid crystal panel away from the backlight unit, or being disposed between the liquid crystal panel and the backlight unit;
wherein a bottom angle of the at least one light guide microstructure is defined as B, a bottom length of the at least one light guide microstructure is defined as P, the bottom angle B and the bottom length P of the at least one light guide microstructure satisfies following conditions: (i) 15.5 degrees≤B≤83.5 degrees; and (ii) 10 micrometers≤P≤2,000 micrometers, such that an oblique viewing angle of the stereoscopic image display device falls within a range from 10 degrees to 60 degrees.

10. The stereoscopic image display device according to claim 9, wherein the liquid crystal panel selectively turns on a part of a plurality of pixels of the liquid crystal panel that are to be used and selectively turns off another part of the pixels of the liquid crystal panel that are not to be used, the backlight unit includes a plurality of light sources, and the plurality of light sources are configured to project a plurality of light beams, such that the plurality of light beams pass through the part of the pixels of the liquid crystal panel that are to be used and are re-converged to generate a stereo image.

\* \* \* \* \*